United States Patent [19]

Breiholz

[11] Patent Number: 4,567,486
[45] Date of Patent: Jan. 28, 1986

[54] PHASE DIFFERENCE MEASUREMENT TECHNIQUE FOR VOR

[75] Inventor: Arlen E. Breiholz, Marion, Iowa

[73] Assignee: Rockwell International Corporation, El Segundo, Calif.

[21] Appl. No.: 464,229

[22] Filed: Feb. 7, 1983

[51] Int. Cl.$^4$ ................................................ G01S 1/44
[52] U.S. Cl. ..................................... 343/401; 343/404; 343/400
[58] Field of Search ................ 343/400, 401, 404, 407

[56] References Cited

U.S. PATENT DOCUMENTS

| | | | |
|---|---|---|---|
| 3,369,238 | 2/1968 | Staufer | 343/401 |
| 3,435,454 | 3/1959 | Vogt | 343/362 |
| 3,470,557 | 9/1969 | Harries et al. | 343/401 |
| 3,523,295 | 8/1970 | Perkins | 343/401 |
| 3,778,601 | 12/1973 | Brock et al. | 343/400 X |
| 3,792,473 | 2/1974 | Sawicki | 343/401 |
| 4,132,990 | 1/1979 | Di Domizio | 343/7.7 X |
| 4,328,548 | 5/1982 | Crow et al. | 343/451 |

Primary Examiner—Charles T. Jordan
Assistant Examiner—Brian S. Steinberg
Attorney, Agent, or Firm—George A. Montanye; H. Fredrick Hamann

[57] ABSTRACT

A system and technique is disclosed which enables the derivation of phase difference measurements in a VOR system. In the phase difference measurement system, a reference VOR signal and a variable VOR signal are received and multiplied by locally generated sine and cosine signals. The multiplication produces two sine and two cosine signals at very low frequencies which are equal to the difference between the frequency of the received signals and the frequency of the locally generated sine and cosine signals. One sine signal and one cosine signal are shifted in phase relative to their counterparts by the phase difference between the variable and reference signals. These phase shifted signals may be multiplied with their counterparts to produce signals representing the sine and cosine of the phase difference between the variable and reference signal. Thereafter, the arc tangent of the sin/cos ratio is derived to produce a signal representing the phase difference or aircraft bearing.

12 Claims, 1 Drawing Figure

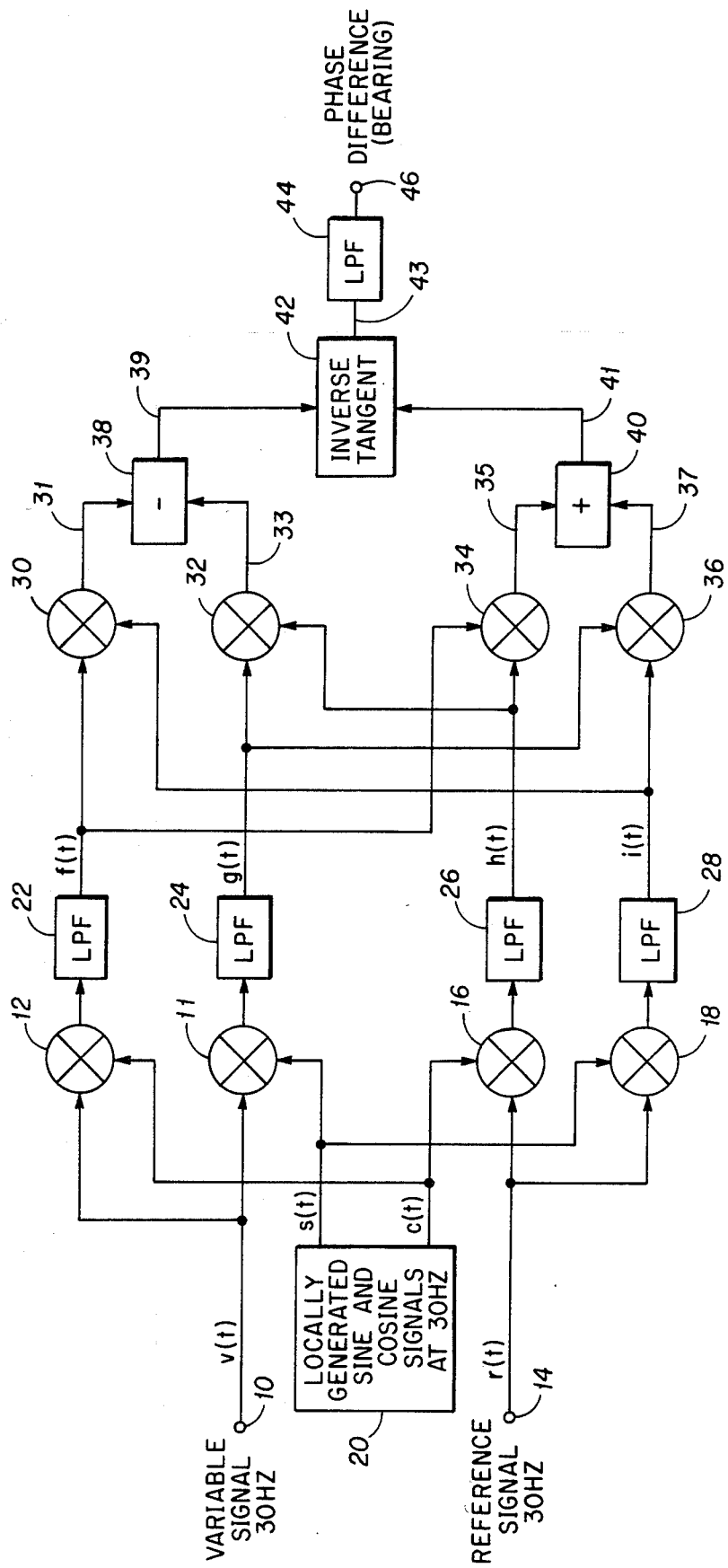

PHASE DIFFERENCE MEASUREMENT TECHNIQUE FOR VOR

BACKGROUND OF THE INVENTION

The present invention relates to signal measurement systems and more particularly to phase difference measurement systems using reference and variable phase signals.

In the prior art, there are a variety of systems which employ phase difference measurement techniques to determine certain characteristics of the system. In such systems, a variable input signal is generally provided which reflects changing system characteristics by producing a change in the phase of that input signal. A reference signal, which maintains a constant phase, is then compared with the variable phase signal in a comparator circuit to produce a phase difference which is directly proportional to the changing characteristic of the system. By measuring the phase difference of the variable input signal with respect to the reference signal, the magnitude, rate of change or other calculation may be determined with respect to the selected characteristic.

By way of example, in one type of aviation navigation system known as the very high frequency omnidirectional range (VOR) technique, a phase difference measurement is made to provide an indication of aircraft bearing with respect to ground positions for enabling aircraft navigation. This particular system is conventional and is currently utilized for aircraft navigation throughout the world. As is known, the system includes a plurality of ground stations positioned at various points throughout each country with each of the stations precisely located on aircraft navigation maps. By determining the location of an aircraft with respect to any one or more of the ground stations, the exact location and course of that aircraft can be accurately fixed.

In one type of VOR system, the VOR ground station includes an omnidirectional transmitter which operates in the carrier frequency range of 108 to 118 MHz and transmits two 30 Hz modulating signals. One of the 30 Hz signals is an FM omnidirectional reference signal which is constant regardless of the radial position of an aircraft with respect to the VOR ground station. The other 30 Hz signal is a variable AM signal which has its phase shifted with respect to the reference signal by an amount dependent upon the angular location of an aircraft with respect to the VOR ground station. The system is designed to allow a measurement of the radial position of an aircraft from the ground station with respect to magnetic north by determining the phase difference between the variable 30 Hz AM signal and the 30 Hz FM reference signal. This phase difference can be converted directly into a bearing indication or used to control a VOR indicator or other display device capable of providing indications of aircraft bearing.

Originally, phase differences in any phase difference measurement system were detected using analog devices and displayed by mechanical or electromechanical instruments. With the advent of digital circuits and computer technology, however, many of the old mechanical and electromechanical systems are being replaced with solid state circuitry. While the advances in technology have provided improved accuracy, reduced weight, lower power consumption, and a reduction in the physical size of the system, other difficulties in converting to digital formats have been encountered that were not observed in prior analog systems. In addition, as many aircraft systems are converted to digital implementations, there is a trend to employ microprocessor-based instrumentation which provides highly efficient and accurate digital calculations but which is limited in size and speed over larger systems. There is therefore a continuing need to improve the operating speed and accuracy of such microprocessor-based instrumentation systems without requiring significant increases in the digital circuitry.

In one phase difference measurement system disclosed in U.S. patent application Ser. No. 435,517 entitled "A Frequency, Amplitude Independent Phase Difference Measurement Technique", filed Oct. 20, 1982 by Thomas E. Gehrke, and assigned to the same assignee as the present invention, an improved technique is disclosed which produces in-phase and quadrature phase signals useful for providing phase difference measurements. In the referenced system, one of the input signals is provided to a phase-locked loop which locks onto the input signal and uses the output of a voltage controlled oscillator to derive the sine and cosine of the input signal. The sine and cosine are then 90° out of phase and form in-phase and quadrature phase signals with equal amplitudes which are used to derive the sine and cosine of the phase shift between the variable and reference signal. Although this technique may be successful in producing accurate determinations of phase difference in the phase difference measurement system, there is still a need for alternative systems for use in different applications.

Accordingly, the present invention has been developed to overcome the shortcomings of the above known and similar techniques and to provide an improved digital system for providing phase difference calculations, particularly in connection with VOR bearing measurements.

SUMMARY OF THE INVENTION

In accordance with the present invention, a system is disclosed which enables the detection of the phase difference between a reference signal and variable signal. In an exemplary embodiment, a 30 Hz reference signal and a 30 Hz variable signal are received from a VOR ground station. Each of the signals is provided as input to multipliers where it is combined with a locally generated sine and cosine signal, in this case a 30 Hz signal. This produces four signals, two of which are sine signals and two of which are cosine signals, all at a very low frequency equal to the difference between the frequency of the received signals and the frequency of the locally generated signal. Of the four signals, one sine signal and one cosine signal are shifted in phase relative to their counterparts by the difference in phase between the received variable and reference signal. The four signals are then multiplied in a manner which results in the production of the sine and cosine of the phase difference. The sine and cosine signals may then be combined using the arc tangent of the ratio of the sine to the cosine to produce an output representing the phase difference or bearing carried by the VOR signals.

It is therefore a feature of the invention to provide a phase shift measurement technique which does not require a 90° phase shifter.

It is a further feature of the invention to provide a phase difference measurement technique which employs the multiplication of locally generated sine and cosine signals with received reference and variable phase signals.

Still another feature of the invention is to provide a digital phase shift measurement system and technique which employs only multipliers to produce a measurement of the phase difference between a variable and reference input signal.

Another feature of the invention is to provide a digital VOR bearing determining system and technique which includes the multiplication of locally generated 30 Hz sine and cosine signals with received variable and reference 30 Hz signals from VOR ground stations to produce a phase difference output over the frequency range of the received signals.

Yet another feature of the invention is to provide a VOR bearing system and technique which combines locally generated sine and cosine signals with the 30 Hz variable and reference VOR signals for producing a phase measurement representing aircraft bearing.

A still further feature of the invention is to provide a digital VOR bearing system and technique which multiplies a locally generated 30 Hz sine and cosine signal with the reference and variable VOR signals to produce sine and cosine components, the arc tangent of which is representative of the aircraft bearing.

Yet still another feature of the invention is to provide a digital VOR bearing system and technique which may be controlled and implemented with microprocessor techniques.

These and other advantages and novel features of the invention will become apparent from the following detailed description when considered with the accompanying drawing wherein:

BRIEF DESCRIPTION OF THE DRAWING

The FIGURE is a schematic diagram showing the primary elements of a phase difference measurement system and technique as applied to a VOR bearing system.

DETAILED DESCRIPTION OF A PREFERRED EMBODIMENT

Referring now to the drawing, there is disclosed a phase difference measurement system in accordance with the present invention. For purposes of illustration, the present technique and system will be described with reference to its specific implementation for producing a digital indication of VOR bearing useful in aircraft navigation systems. It should be understood, however, that the specific structural combinations and techniques described with respect to the inventive concept may be employed in a variety of other phase difference measurement systems and not specifically restricted to VOR signals.

Turning now to the FIGURE, there is shown a proposed implementation of the phase difference measurement system in accordance with the present invention. In this example, a variable signal, in this instance one of the 30 Hz signals from the VOR, is received by terminal 10 as signal v(t) and coupled as one input to multipliers 11 and 12. As previously noted, this 30 Hz signal varies in phase depending upon the position of an aircraft relative to the particular ground station transmitting the VOR signal. A second input, in this instance the other 30 Hz reference signal from the same VOR, is received by terminal 14 as signal r(t) and coupled as one input to multipliers 16 and 18. Locally generated 30 Hz sine and cosine signals of equal amplitude are generated by separate sources to provide a sine signal output s(t) and a cosine signal output c(t) which in the present instance are both shown as output from circuit 20. The sine signal s(t) is provided as a second input to multipliers 11 and 18 while the cosine signal c(t) is provided as a second input to the multipliers 12 and 16.

The output products of the multipliers 11, 12, 16 and 18 are coupled through low pass filters 22, 24, 26 and 28 respectively to remove double frequency components of the four product signals from the multipliers to produce the signals f(t), g(t), h(t) and i(t), as shown in the drawing. The f(t) signal is coupled as a first input to multipliers 30 and 34, while the g(t) signal is coupled as a first input to the multipliers 32 and 36. Likewise, the h(t) signal is coupled as a second input to multipliers 32 and 34 while the i(t) signal is coupled as a second input to multipliers 30 and 36. The product outputs 31 and 33 from multipliers 30 and 32 are then coupled to a subtraction circuit 38 while the product outputs 35 and 37 from multipliers 34 and 36 are coupled to a summing circuit 40. Thereafter, the difference between the product signals subtracted in circuit 38 (output 33 minus output 31) is provided at the output 39 amd the summation of the product signals added in circuit 40 is provided at the output 41. The difference output 39 is the sine of the phase difference between the variable and reference signal while the sum output 41 is the cosine of the same phase difference. These signals are provided as inputs to circuit 42 which provides as its output 43 the inverse tangent of the ratio of the sine/cosine of the phase difference. The output 43 is then provided to a low pass filter 44 having an output 46 which represents the phase difference or bearing estimate obtained from the VOR signals.

In order to understand the operation of the above system, the following mathematical derivations can be shown to support the production of the bearing signal at the output 46. Specifically, assume that the input signals to terminals 10 and 14, respectively, are at terminal 10:

$$v(t) = \sin(\omega t + \phi) \tag{1}$$

and at terminal 14:

$$r(t) = \sin(\omega t) \tag{2}$$

where v is the variable 30 Hz signal at terminal 10, r is the reference 30 Hz signal at terminal 16, $\omega$ is nominally $2\pi 30$ radians per second, $\phi$ is the phase shift caused by the bearing, and t is the time. The locally generated reference signals which are shown in the figure are also represented as:

$$s(t) = \sin(\Omega t) \tag{3}$$

and the cosine signal as:

$$c(t) = \cos(\Omega t) \tag{4}$$

where $\Omega$ is nominally $2\pi 30$ radians per second, but is probably not equal to $\omega$. Therefore, assume that $\Omega$ can be represented as:

$$\Omega = \omega + \delta \tag{5}$$

where $\delta$ represents the difference between the $\omega$ and $\Omega$.

Referring again to the drawing, each of the two incoming signals v(t) and r(t) is multiplied by each of the two locally generated signals s(t) and c(t) to produce the product outputs:

$$\hat{f}(t) = v(t) s(t) \tag{6}$$
$$= \sin(\omega t + \phi) \sin(\omega + \delta)t$$
$$= 0.5[\cos(-\delta t + \phi) - \cos((2\omega + \delta)t + \phi)]$$

and $$\hat{g}(t) = v(t) c(t) \tag{7}$$
$$= \sin(\omega t + \phi) \cos(\omega + \delta)t$$
$$= 0.5[\sin((2\omega + \delta)t + \phi) + \sin(-\delta t + \phi)]$$

and $$\hat{h}(t) = r(t) s(t) \tag{8}$$
$$= \sin(\omega t) \sin(\omega + \delta)t$$
$$= 0.5[\cos(-\delta t) - \cos((2\omega + \delta)t)]$$

and $$\hat{i}(t) = r(t) c(t) \tag{9}$$
$$= \sin(\omega t) \cos(\omega + \delta)t$$
$$= 0.5[\sin(2\omega + \delta)t + \sin(-\delta t)].$$

By filtering each of the above products in low pass filters 22, 24, 26 and 28, respectively, the double frequency components of the above four signals can be removed, thereby leaving the following:

$$f(t) = 0.5 \cos(-\delta t + \phi) \tag{10}$$

$$g(t) = 0.5 \sin(-\delta t + \phi) \tag{11}$$

$$h(t) = 0.5 \cos(-\delta t) \tag{12}$$

$$i(t) = 0.5 \sin(-\delta t) \tag{13}$$

In the form of the above equations, it can be seen that the following trigonometric identities can be applied to the above products:

$$\sin(A) \cos(B) - \cos(A) \sin(B) = \sin(A - B) \tag{14}$$

and $$\cos(A) \cos(B) + \sin(A) \sin(B) = \cos(A - B) \tag{15}$$

If, from the above equations (10) and (11), the representation $(-\delta t + \phi)$ is substituted for A, and $(-\delta t)$ is substituted for B, and both of these are combined with the amplitudes of 0.5 as derived in equations (10-13), the resulting form of identity is represented as follows:

$$g(t)h(t) - f(t)i(t) = 0.25 \sin(-\delta t + \phi + \delta t) \tag{16}$$
$$= 0.25 \sin(\phi)$$

and $$f(t)h(t) + g(t)i(t) = 0.25 \cos(-\delta t + \phi + \delta t) \tag{17}$$
$$= 0.25 \cos(\phi)$$

It will be seen that the above form is exactly that produced by multiplying the identified signals f(t), g(t), h(t), i(t) in the multipliers 30, 32, 34 and 36, as shown in the drawing, and then combining those products in the subtraction circuit 38 and summing circuit 40 as described. The output 39 from circuit 38 is therefore the sine of the phase difference and the output from circuit 40 is the cosine of the phase difference which, in the present instance, are the sine and cosine of the bearing as reflected by the phase of the variable signal at terminal 10. The inverse tangent of the ratio of the sine/cosine is taken through the inverse tangent circuit 42 and then low pass filtered through circuit 44 to provide the final bearing output at terminal 46.

In order to digitally implement the production of a bearing signal from the analog VOR signals, it will be apparent that the 30 Hz variable signal and 30 Hz reference signal must first be digitized by analog-to-digital converters (not shown) and then appropriately filtered to produce the proper digital representations of the analog signals. Digital techniques and structures utilized in making such conversions and filtering are well known in the art and will therefore not be disclosed in any greater detail for a proper understanding of the invention. It should be understood, likewise, that the multipliers 11, 12, 16, 18, 30, 32, 34 and 36, as well as the low pass filters 22, 24, 26, 28 and 44, along with the subtraction circuits 38 and 40 and the inverse tangent circuit 42 are all conventionally constructed digital circuits capable of performing the functions indicated in a conventional manner.

In implementing the present invention, it will be appreciated that conventional digital circuits may be employed or appropriate and well known microprocessor computational techniques may be used to provide the digital computations. Thus, the individual elements 11, 12, 16, 18, 22, 24, 26, 28, 30, 32, 34, 36, 38, 40, 42, 44 may be implemented by discrete digital circuits performing those functions or by the performance of microprocessor computations on the digital values received at the terminals 10 and 14. The signals provided by 20 may also be converted to digital outputs. Such digital elements and microprocessor control are known and are unnecessary for a further understanding of the invention.

The operation of the above system and technique was simulated using a Digital Equipment Corporation PDP-11/60 computer programmed in Fortran to produce the functions described, but using simulated digitally generated VOR bearing signals. The program used to produce the simulation is set forth below. The same program and a microprocessor could be used to produce the digital phase difference measurement system of the FIGURE merely by digitizing and feeding the actual VOR signals at 10 and 14 in place of the digitally generated VOR signals specified in the program. As will be seen, the program includes a digital filter which in the example shown is a 6-pole low pass filter with a 30 Hz cut-off for rejecting the 60 Hz double frequency products as above described. The filter is implemented in the program as a cascade of two pole sections, but the exact specifications of the filter are not critical to the operation of the system, it being apparent that other embodiments could be employed for producing similar results. It should be noted that as the bandwidth of the signals is decreased by filtering during processing, the sampling rate may be reduced proportionately, thereby resulting in lower computation rates to provide the bearing or phase difference signal from 46.

As can be seen from the above description, the present invention provides a technique for enabling the implementation of a phase difference measurement, and more particularly, for providing an alternate signal output representing bearing information in a digital VOR processing system. The system enables the digital multiplication of locally generated sine and cosine signals with converted digital values for the variable and reference signals of a VOR system. This multiplication produces sine and cosine signals of the phase which may be converted to a phase difference output representing the bearing. By use of this implementation, state-of-the-art microprocessors may be employed to produce the phase difference outputs necessary to reflect the bearing measurement made in the specific example of the aircraft navigation system described above. The system may be implemented with conventional digital circuits and used to modify digital systems currently employed to produce such bearing information. All of these are advantages that are unrecognized and not suggested by the prior art.

Obviously, many other modifications and variations of the present invention are possible in light of the above teachings. It is therefore to be understood that within the scope of the appended claims, the invention may be practiced otherwise than as specifically described.

I claim:

1. A signal processing system comprising:
   means for receiving a first signal;
   means for receiving a second signal having a phase difference with respect to said first signal;
   means for multiplying each of said first and second signals with a sine and cosine signal to produce a plurality of product outputs;
   means for combining said product outputs to produce sine and cosine outputs of the phase difference between said first and second signal; and
   means for providing an output of the inverse tangent of the sine output divided by the cosine output as a representation of the phase difference between said first and second signal.

2. The system of claim 1 further comprising means for filtering said plurality of product outputs to filter double frequency components produced during multiplication.

3. The system of claim 1 further including means for low pass filtering the inverse tangent to produce a phase difference output.

4. A VOR system which provides an aircraft bearing indication comprising:
   means for receiving a first VOR signal;
   means for receiving a second VOR signal which differs in phase from said first VOR signal in accordance with aircraft bearing;
   means for generating sine and cosine signal outputs;
   means for multiplying each of said first and second VOR signals by each of said generated sine and cosine signal outputs to produce a plurality of product outputs;
   means for combining said product outputs for providing outputs of the sine and cosine of phase difference between said first and second VOR signal; and
   means for providing an output of the inverse tangent of the sine of the phase difference output divided by the cosine of the phase difference output as a representation of aircraft bearing.

5. The system of claim 4 wherein said first and second VOR signals are 30 Hz signals.

6. The system of claim 4 wherein said first VOR signal is a fixed phase VOR signal and said second VOR signal is a variable phase VOR signal.

7. A VOR system which provides an aircraft bearing indication comprising:
   means for receiving a first VOR signal;
   means for receiving a second VOR signal which differs in phase from said first VOR signal in accordance with aircraft bearing;
   means for generating sine and cosine signal outputs;
   means for multiplying each of said first and second VOR signals by each of said generated sine and cosine signal outputs to produce a plurality of first product outputs; and
   means for combining said first product outputs for providing outputs of the sine and cosine of phase difference between said first and second VOR signal, said means for combining including,
      means for multiplying said first product outputs with one another to produce second product outputs,
      means for subtracting second product outputs to produce said sine of the phase difference output, and
      means for summing second product outputs to produce said cosine of the phase difference output.

8. A phase difference measurement system comprising:
   means for receiving a first signal;
   means for receiving a second signal which differs in phase from said first signal;
   means for generating sine and cosine signals;
   first means for multiplying said first signal by said cosine signal to produce a first product output;
   second means for multiplying said first signal by said sine signal to produce a second product output;
   third means for muliplying said second signal by said cosine signal to produce a third product output;
   fourth means coupled to multiply said second signal by said sine signal to produce a fourth product output;
   means coupled to each of said product outputs for low pass filtering said product outputs to filter eliminate double frequency components in each of said outputs;
   fifth means coupled to multiply said first product output by said fourth product output for producing a fifth product output;
   sixth means coupled to multiply said second product output by said third product output for producing a sixth product output;
   seventh means coupled to multiply said third product output by said first product output for producing a seventh product output;
   eighth means coupled to multiply said fourth product output by said second product output for producing an eighth product output;
   a subtraction circuit coupled to subtract said fifth product output from said sixth product output to produce a signal representing the sine of the phase difference between said first and second signal;
   a summing circuit coupled to add said eighth product output with said seventh product output to produce a signal representing the cosine of the phase difference between said first and second signal;
   means for providing an output of the inverse tangent of the sine signal from the subtraction circuit divided by the cosine signal from said summing circuit; and
   means for low pass filtering the inverse tangent output to produce a signal representing the phase difference between said first and second signal.

9. The system of claim 8 wherein said first signal is a reference VOR signal and said second signal is a variable phase VOR signal and said low pass filtered inverse tangent output represents aircraft bearing.

10. A method for obtaining signals representing phase difference comprising:

providing a first signal of a given frequency;

providing a second signal of the same given frequency having a phase which differs with respect to said first signal;

multiplying each of said first and second signals by sine and cosine signals of said same given frequency to produce a plurality of product outputs;

filtering and combining said product outputs to produce signals representing the sine and cosine of the phase difference between said first and second signals; and calculating the inverse tangent of the ratio of said sine signal representing phase difference divided by said cosine signal representing phase difference to produce an output signal indicative of the phase difference between said first and second signals.

11. The method of claim 10 wherein said steps of providing said first and second signals includes providing said first signal as a reference signal having a fixed phase and providing said second signal as a variable signal having a phase which varies with respect to the phase of said reference signal.

12. The process of claim 11 wherein said first and second signals are reference and variable phase VOR signals, respectively.

* * * * *